Figure 1:
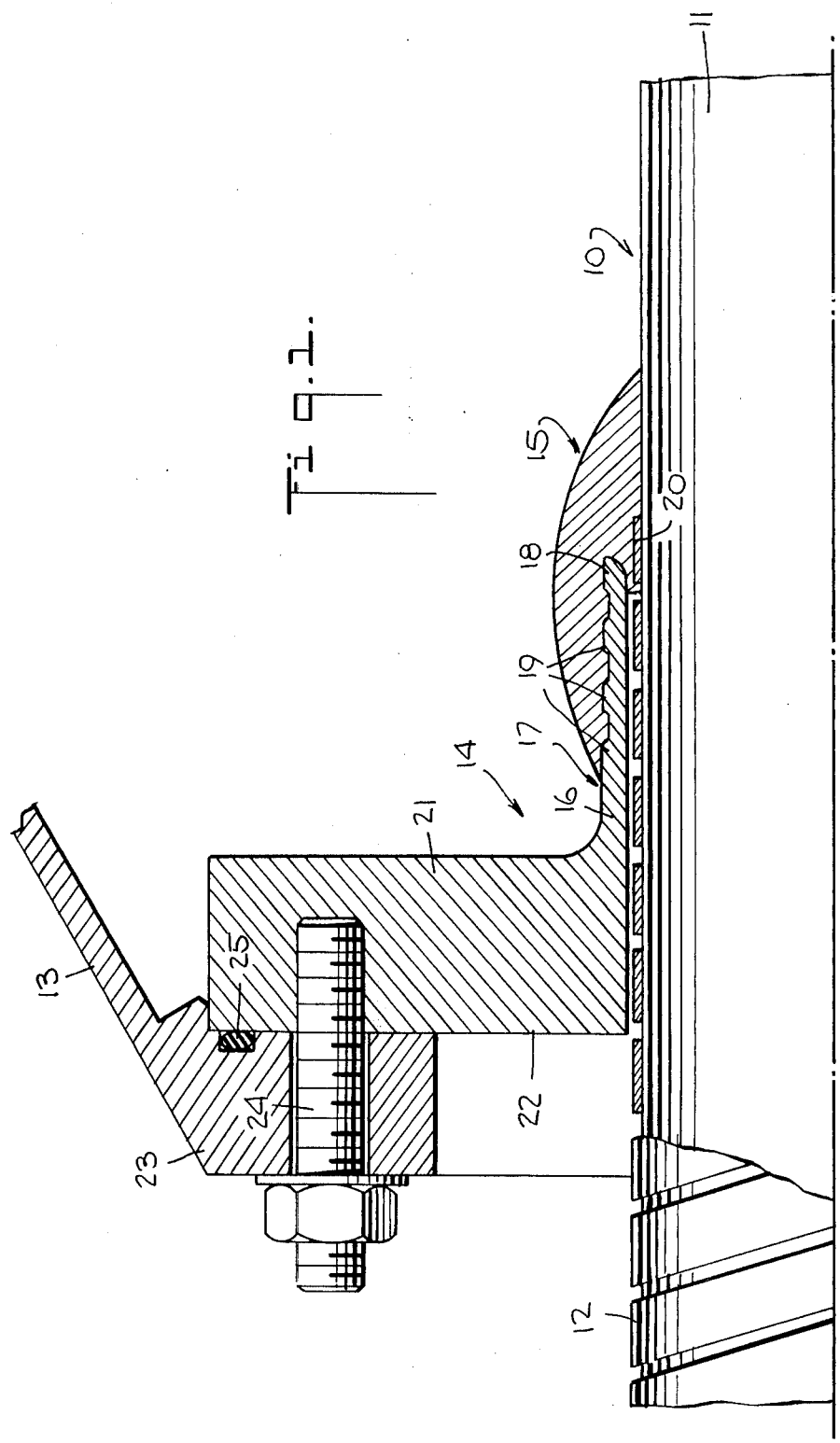

United States Patent [19]
Buroni

[11] 3,920,884
[45] Nov. 18, 1975

[54] PRESSURIZED CABLE ACCESSORY CONNECTOR

[75] Inventor: Vittorio Buroni, Milan, Italy

[73] Assignee: Industrie Pirelli Societa Per Azioni, Milan, Italy

[22] Filed: May 1, 1974

[21] Appl. No.: 465,829

[30] Foreign Application Priority Data
May 23, 1973 Italy .................................. 24443/73

[52] U.S. Cl. ............................. 174/21 R; 174/75 R
[51] Int. Cl.² ........................................ H02G 15/24
[58] Field of Search .......... 174/19, 20, 21 R, 21 JC, 174/21 C, 22 R, 22 C, 23 R, 75 R, 77 R

[56] References Cited
UNITED STATES PATENTS
3,744,130  7/1973  Papadopulos ............. 174/21 R X
3,767,835  10/1973  Engelhardt ..................... 174/19 X
FOREIGN PATENTS OR APPLICATIONS
668,753  3/1952  United Kingdom ................. 174/20
589,172  6/1947  United Kingdom ................. 174/20

Primary Examiner—Arthur T. Grimley
Attorney, Agent, or Firm—Brooks Haidt Haffner & Delahunty

[57] ABSTRACT

A connector for connecting an electric cable filled with fluid under pressure and having a sheath which may be surrounded by one or more metal harnesses to an accessory, such as a joint or sealing end, the connector comprising a flanged sleeve which extends around the prepared cable end and the flange of which is secured to the accessory entrance bell with the sleeve extending into the interior of the bell which, when the accessory is in use, contains the fluid under pressure. The end of the sleeve within the bell is secured to the sheath and, if present, to the harness by metal applied thereto, such as by soldering or brazing, the securing metal thereby being subjected to substantially equal internal and external pressures when the accessory is in use.

9 Claims, 2 Drawing Figures

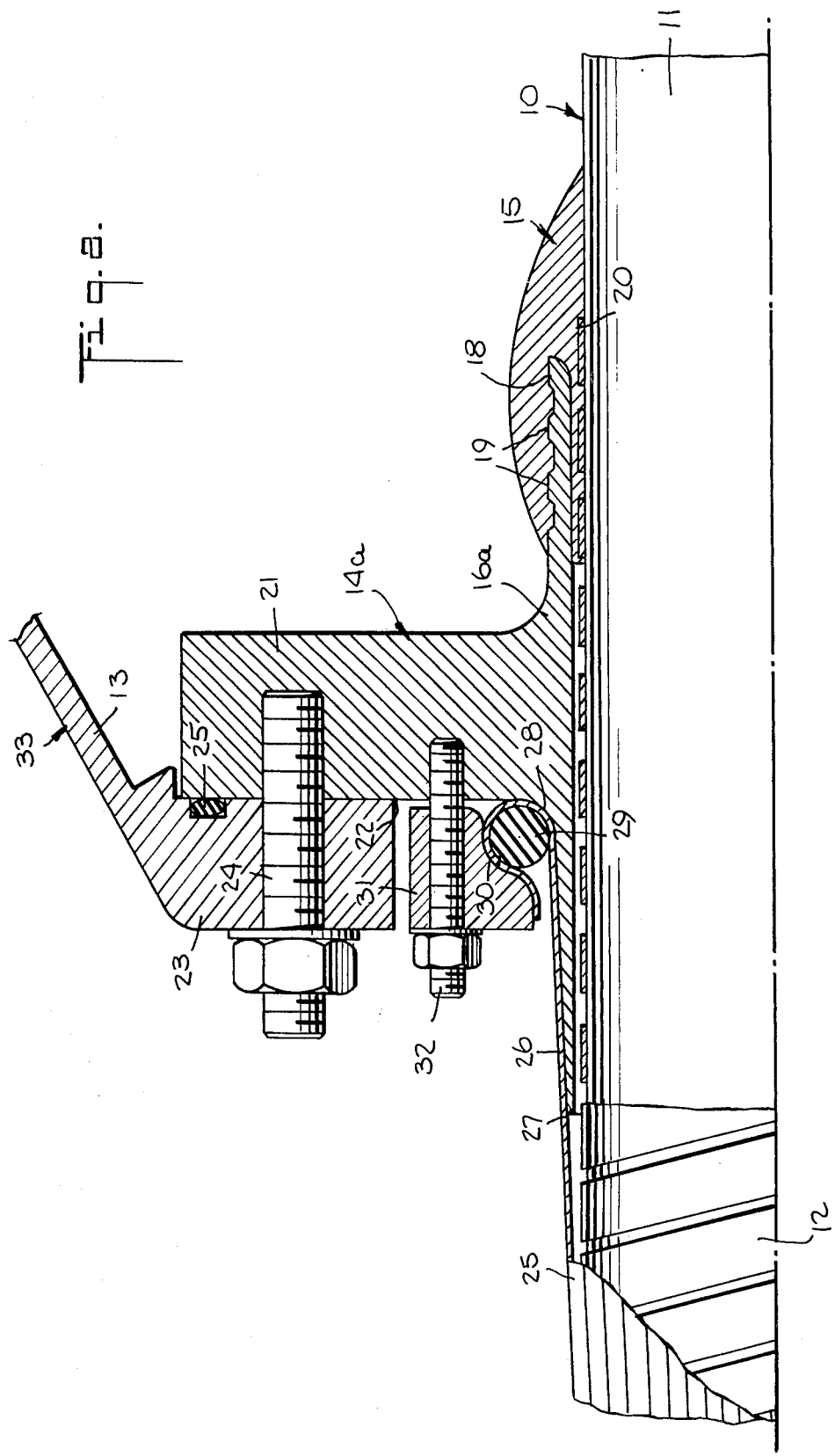

PRESSURIZED CABLE ACCESSORY CONNECTOR

The present invention relates to connectors for connecting an internally pressurized electric cable to an electrical system accessory, and more particularly, it relates to an improvement in the connection of a cable containing an insulating fluid under pressure to the zone of the accessory intended for the entrance of the cable.

The accessory, which can be, for example, a joint, a sealing end or an immersed sealing end, can be subjected to high pressures either for construction reasons or for use reasons, e.g., when an accessory is installed in a position at the lower end of a cable which is laid so as to extend vertically.

The impregnated cables which are most often used are cables which are provided with a lead sheath and which are reinforced, for withstanding the radial stresses to which the sheath is subjected, by a transversely extending harness or "frettage" constituted by metallic straps, made, for example, of copper, bronze, etc., wound helically around the lead sheath. Frequently, a longitudinal harness is also provided, and such longitudinal harness may be inside or outside the helically wound harness.

To illustrate the problems encountered in the prior art, reference will be made, by way of example, to the connection of a cable provided with both a longitudinal and a transverse harness, the latter surrounding the former, to an accessory.

At the cable end to be inserted into the accessory, the transverse harness is removed for a preestablished distance from the portion of the cable which will be surrounded by the free end of a terminal portion of the accessory. Such a terminal portion is called "an end bell" by the technicians in this field and is shaped as a frustum of cone. At the portion of the cable from which the transverse harness has been removed, the longitudinal harness is bent back, and the accessory is positioned in such a way that the free end of its end bell surrounds the lead of the sheath. The outer surface of the end bell is then joined with the sheath by means of soldering or brazing using an alloy metal, for example a tin-lead alloy containing about 33% of tin. Then, a second application of the alloy is carried out, and it is wiped in such a way as to avoid the formation of cavities. The straps of the longitudinal harness are then redistributed on the second layer of alloy, and they are subsequently secured and reinforced by means of an appropriate winding of metallic wires, intended to compensate for the lack of transverse harness and, therefore, to oppose the pressure on the sheath due to the difference between the pressure of the interior insulating fluid and the atmospheric pressure.

It has been ascertained, however, that as a practical matter, the reinforcement provided by the metallic wires is inadequate. In practice, the wires become disarranged, the turns of the wire become loose, both because of thermal reasons and because of the internal pressure, and the joining alloy metal migrates and fills up all the free spaces. Consequently, any air bubble which may be in the joining metal disappears and all the interstices between the straps of the longitudinal harness and the winding wires are filled.

In particular, if after a certain time of service the lead sheath is examined in proximity to the free extremity of the end bell, namely, under the joining metal, it will be noted that it is distended. However, the same sheath, in proximity to the end bell, but on the inside of the accessory, maintains its original configuration, since at that portion the sheath is subjected to balanced pressures, i.e., the oil pressure in the cable is the same as it is in the accessory, and hence, on the outer surface of the sheath.

The present invention has, as one object, the elimination of disadvantages mentioned hereinbefore by means of an auxiliary connecting device which improves the connection to the accessory in such a way that the radial stresses on the lead sheath, due to the inner pressure of the insulating fluid, are contained in a continuous way for the whole cable length, and the joining metal between the end bell and the cable is subjected to balanced pressures which assures its reliability and prevents the migration of the alloy metal.

In particular, the main object of the invention is an improved connector for a cable impregnated with insulating fluid and provided with a metal sheath, either with or without longitudinal and/or transverse harness, characterized in that the connection of the cable at the entrance portion of the accessory is carried out by means of an interposed annular connecting element surrounding the cable, said interposed element being secured to said entrance portion with appropriate means and being secured to the sheath by joining metal on the side of the element which faces in the same direction as the cable end and which is within the accessory.

The objects and advantages of the invention will be apparent to those skilled in the art from the following description of the presently preferred embodiments thereof, which description should be considered in conjunction with the accompanying drawings, in which:

FIG. 1 is a fragmentary, longitudinal, sectional view of the connection of an end of an impregnated cable provided with a lead sheath and a transverse harness to an accessory in accordance with the invention; and FIG. 2 is a view similar to FIG. 1 of a further embodiment of the connection of the invention for use with a cable having both a longitudinal and a transverse harness.

FIG. 1 illustrates a portion of an impregnated cable 10 provided with a sheath 11 which may be made of lead or aluminum. The sheath 11 is surrounded by an armor, or transverse harness, 12 constituted by a metal strap, such as a strap of copper or bronze, which is helically would around the sheath 11 and is able to contain the radial stresses exerted on the sheath 11 of the cable 10 by the pressure of the impregnating fluid, which may, for example, be oil. The end of the cable 10 is to the right as viewed in FIG. 1, and it will be noted from FIG. 1 that the armor 12 has been removed from the cable end portion.

The connection of the cable 10 to the entrance portion, or end bell, 13 forming part of the accessory, is carried out by the interposition of an annular connecting element 14, surrounding the cable 10, which is secured to the end bell 13 by means hereinafter described and to the cable 10 by a joining metal 15 applied by soldering, brazing, etc. on the accessory side of the element 14. Thus, the metal 15 is bonded by an intermetallic bond with both the element 14 and the sheath 11 which provides a fluid-tight seal between the element 14 and the sheath 11. The space within the end bell 13 is filled with a fluid, such as the cable impregnating fluid, after the connection is completed and, therefore, the expression "accessory side" will be used to designate the side of the element or part which faces the space which is enclosed in the accessory when the joint, sealing end or oil immersed sealing end is completed.

The interposed annular connecting element 14 surrounds the armor or transverse harness 12 in proximity to the end of the latter. With aluminum sheathed cables where the harness is lacking, the annular connecting element 14 is arranged directly around the sheath. Preferably, the harness 12 protrudes with respect to the interposed element 14 for a length ranging from a few millimeters to a few centimeters.

The interposed element 14 comprises substantially a sleeve 16, the outer surface 17 of which, in proximity to the end 18 at the accessory side, is provided with circumferentially extending ribs 19 or other roughening means to ensure better interlocking of the metal 15 and the sleeve 16.

The metal 15, in addition to fastening the sleeve 16 of the interposed element 14 to the sheath 11, secures both the element 14 and the sheath 11 to the transverse harness 12, since it welds the portion 20 of the latter, protruding on the accessory side, to the end 18 of the sleeve 16.

The end of the sleeve 16, directed to the cable side, the expression "cable side" meaning the space which is outside the accessory when the joint, sealing end or oil immersed sealing end is completed, is provided with a first annular flange 21 having a face 22 oriented to the cable side which engages a second annular flange 23 at the end of the bell 13 of the accessory.

The two flanges 21 and 23 are secured together by means of stud bolts 24, and a sealing element 25, for example, an O-ring, ensures tightness between the flanges 21 and 23 which, together with the stud bolts 24, represent only one embodiment of means for fastening the interposed element 14 to the entrance bell 13 of the accessory. It will be apparent to those skilled in the art that other known methods may be used to secure the element 14 to the entrance bell 13.

The connection illustrated in FIG. 2, where elements corresponding to elements shown in FIG. 1 are designated by the same reference numerals, involves a cable 10 which, in addition to having a transverse harness 12, comprises a longitudinal armor or harness 15 superimposed on the transverse harness 12 and terminating at a pre-established distance from the cable end.

In the embodiment in FIG. 2, the interposed element 14a comprises a sleeve 16a which has thereon, in an intermediate position, the flange 21. The portion 26 of the sleeve 16a, disposed on the cable side, is tapered toward the free end 27 of the sleeve 16a, and extends from the face 22 of the flange 21 in such a way as to form a recess 28.

The terminal or end portion of the longitudinal harness 25 surrounds the portion 26 and extends into the recess 28. Such end portion also extends around a toroidal body or ring 29 and is pinched or gripped between the wall of the recess 28 and the inner grooved surface 30 of a ring 31 secured to the outer face 22 of the flange 21 with appropriate means, for example, stud bolts 32.

It will be apparent to those skilled in this field that the use of the interposed annular connecting element 14 or 14a between the sheath 11 and the entrance bell 13 of the accessory permits the application of the joining metal 15 inside the accessory itself. In fact, before carrying out the steps required to form the joint, or the sealing end, or the oil immersed sealing end, the casing 33 of which the end bell 13 forms a part, is applied over the cable end, and then, the interposed element 14 or 14a is also positioned on said cable end, orienting it in such a way that the face 22 of the flange, having the seats for receiving the stud bolts 24 or bolts 24 and 32, is oriented to the cable side. Also, the end of the sleeve 16 oriented to the accessory side is positioned in proximity to the end portion of the transverse harness 12. After having effected the electric connections, the joining metal 15 is applied to the sleeve 16, to the transverse harness 12 and to the lead sheath 11 in the known manner. Then, the casing 33 is advanced to the right until the flange 23 engages the face 22 of the flange 21, and the nuts are applied to the stud bolts 24 and tightened.

The joining metal 15 which is inside the accessory is in a position where it is not subjected to unequal pressures, since, both on its inner face and on its outer face, it is subjected to a pressure equal to that of the impregnating fluid.

The connection of the invention has the further advantage that, if the sheath 11 is a lead sheath, no part of the sheath 11 which is subjected to an internal pressure greater than the external pressure is unsupported. Thus, all of the sheath 11 at the cable side of the metal 15 is supported by the transverse harness 12 which fills the whole hollow space between the cable sheath 11 and the interposed element 14. The portion of the sheath 11 from which the harness 12 has been removed is within the bell 13 where the sheath 11 is subjected to the pressure of the insulating oil both from the inside and from the outside, and therefore, such portion of the sheath 11 is subjected to balanced pressures.

The interposed elements 14 and 14a have been illustrated in both cases as a single piece, but it will be apparent that each could be constituted by several pieces secured together in an appropriate manner.

Although preferred embodiments of the present invention have been described and illustrated, it will be understood by those skilled in the art that various modifications may be made without departing from the principles of the invention.

I claim:

1. In an electric cable interconnection with an accessory therefor, said cable having a metal sheath containing an insulating fluid and said accessory having a wall extending transversely to the length of said cable and having an entrance opening therethrough and with a radially extending face around said opening and said accessory, during use, having fluid under pressure at its interior, said cable having an end extending through said opening into said interior, the combination therewith of an annular element surrounding said sheath, said annular element having a radially outwardly extending flange portion and a tubular portion integral with said flange portion, said flange portion being secured to, and in fluidtight engagement with, said wall at said opening with a radially extending face of said flange against said face of said wall and said tubular portion extending from said flange portion into said interior of said accessory, and joining metal extending around said sheath at the interior of said accessory and bonded to both said sheath and said tubular portion of said element to form a fluid-tight seal between said sheath and said tubular portion.

2. An interconnection as set forth in claim 1, wherein said flange portion is secured to said wall by bolts extending between said wall and said flange portion.

3. An interconnection as set forth in claim 1, wherein said tubular portion has a plurality of circumferentially extending ribs on the exterior surface thereof and said metal extends over said ribs.

4. An interconnection as set forth in claim 1, wherein said cable further comprises a transverse metal harness around said sheath, said harness extends intermediate said tubular portion and said sheath and has a portion extending beyond the end of said tubular portion in the direction of said interior of said accessory and said portion of said harness is embedded in and is bonded to said joining metal.

5. An interconnection as set forth in claim 1, wherein said tubular portion also extends from said flange portion in a direction opposite to the direction of said interior from said flange portion to provide an exterior sleeve portion extending from said flange portion, said cable further comprises a longitudinal metal harness and said longitudinal harness extends over and around said exterior sleeve portion.

6. An interconnection as set forth in claim 5, wherein said exterior sleeve portion decreases in thickness from adjacent said flange portion to the end thereof remote from said flange portion.

7. An interconnection as set forth in claim 1, wherein said face of said wall faces toward said interior of said accessory.

8. In an electric cable interconnection with an accessory therefor, said cable having a metal sheath containing an insulating fluid and a longitudinal metal harness around said sheath and said accessory having a wall with an entrance opening therethrough and, during use, having fluid under pressure at its interior, said cable having an end extending through said opening into said interior, the combination therewith of an annular element surrounding said sheath and secured to said wall at said opening, said element having a flange and sleeve extending from said flange into the interior of said accessory and from said flange in a direction opposite to the direction of said interior from said flange to provide an exterior sleeve portion extending from said flange, joining metal extending around said sheath at the interior of said accessory and bonded to both said sheath and said sleeve to form a fluid-tight seal between said sheath and said sleeve, said longitudinal metal harness extending over and around said exterior sleeve portion, a ring extending around said harness and said exterior sleeve portion with said harness between said ring and said sleeve portion, and means connected to said flange and pressing said ring toward said flange and thereby pressing said harness toward said element.

9. An interconnection as set forth in claim 8, wherein said harness at least partly encircles said ring and said means connected to said flange comprises a second ring engaging said harness where it encircles said first-mentioned ring.

* * * * *